(No Model.) 2 Sheets—Sheet 1.
H. K. HANSEN.
COIN CONTROLLED APPARATUS FOR TESTING STRIKING POWERS.
No. 574,324. Patented Dec. 29, 1896.
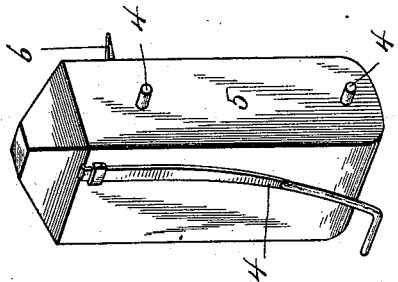
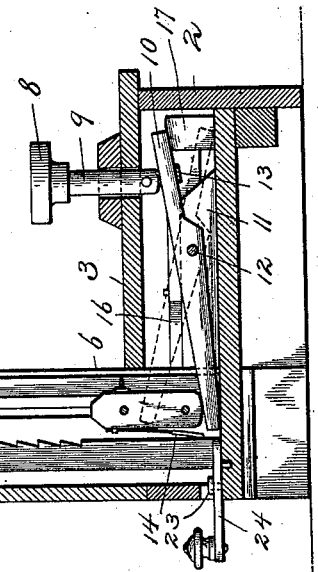
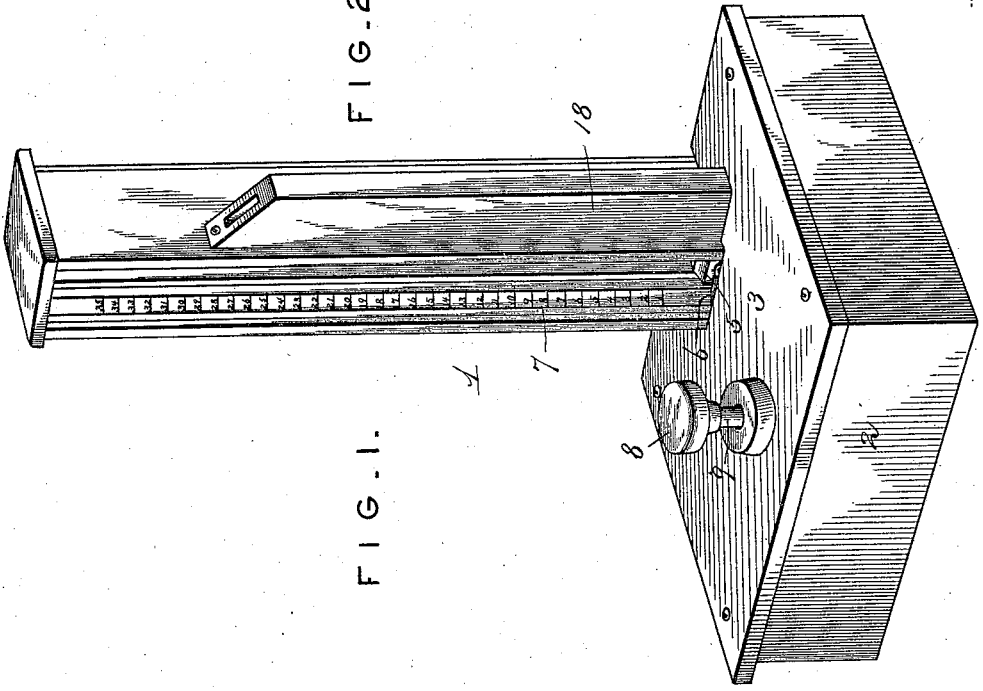
Inventor
Hans K. Hansen.
Witnesses
Harry L. Amer.
H. F. Riley
By his Attorneys,
C. A. Snow & Co.

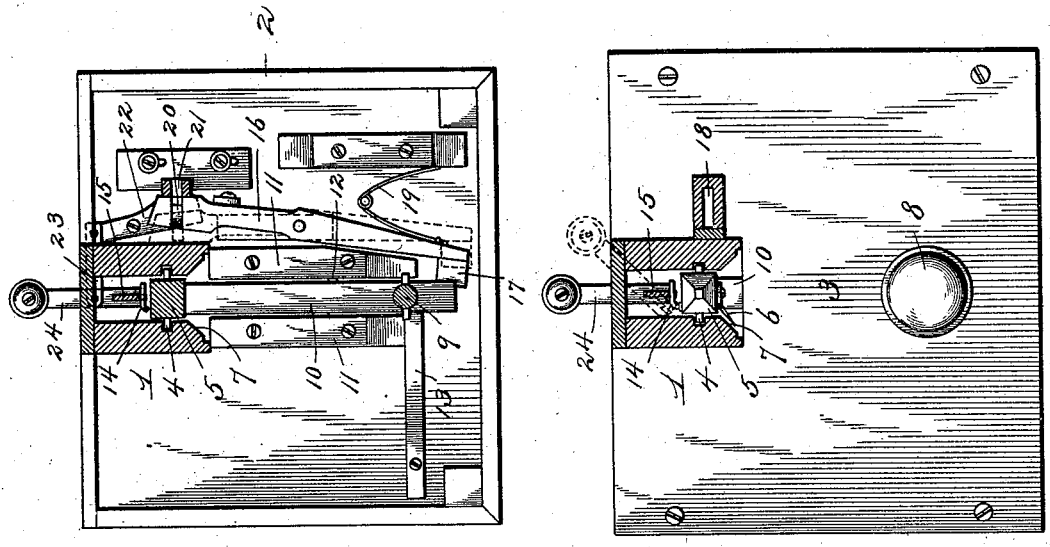
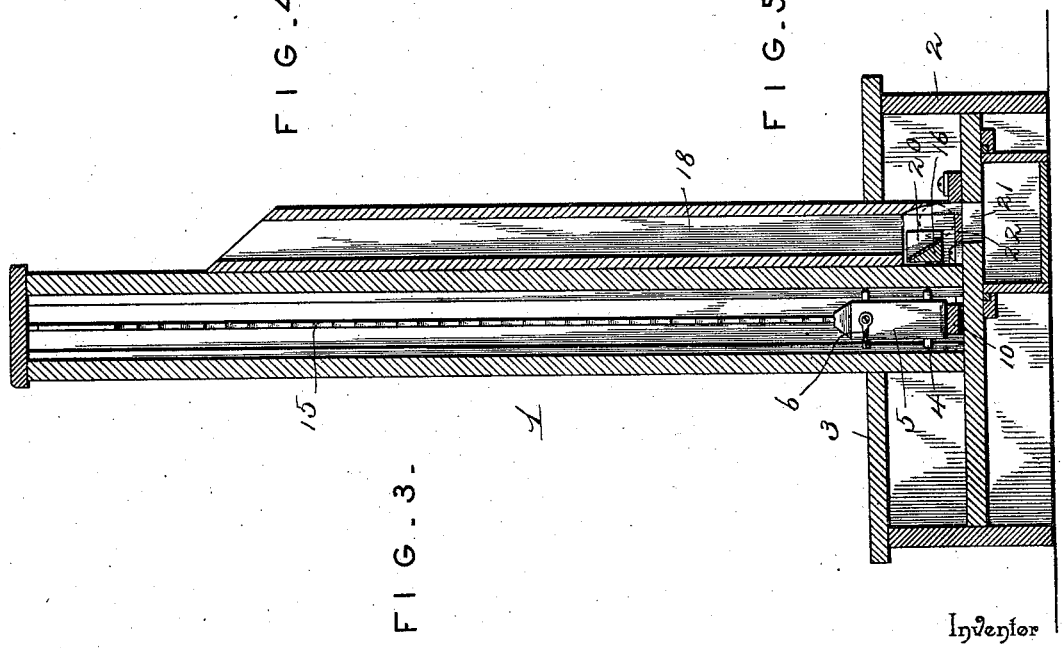

UNITED STATES PATENT OFFICE.

HANS K. HANSEN, OF ALTA, IOWA.

COIN-CONTROLLED APPARATUS FOR TESTING STRIKING POWERS.

SPECIFICATION forming part of Letters Patent No. 574,324, dated December 29, 1896.

Application filed March 23, 1896. Serial No. 584,517. (No model.)

*To all whom it may concern:*

Be it known that I, HANS K. HANSEN, a citizen of the United States, residing at Alta, in the county of Buena Vista and State of Iowa, have invented a new and useful Coin-Controlled Apparatus for Testing the Striking Powers, of which the following is a specification.

The invention relates to improvements in coin-controlled apparatus for testing the striking powers.

The object of the present invention is to improve the construction of coin-controlled apparatus for testing strength, and to provide a simple, inexpensive, and efficient one which will be adapted for testing the striking powers and which will be under complete control of the operator in order that the indicator may remain stationary at the point indicating the strength of a person as long as desired, in order that the operator may satisfactorily ascertain the amount of pressure or the force of a blow exerted on the apparatus.

The invention consists in the construction and novel combination and arrangement of parts hereinafter fully described, illustrated in the accompanying drawings, and pointed out in the claims hereto appended.

In the drawings, Figure 1 is a perspective view of a coin-controlled strength-testing apparatus constructed in accordance with this invention. Fig. 2 is a vertical longitudinal sectional view. Fig. 3 is a transverse sectional view. Fig. 4 is a horizontal sectional view, the coin-operated lever being shown in engagement with the indicator-actuating lever in full lines and swung back in dotted lines. Fig. 5 is a horizontal sectional view of the hollow post or standard and the coin-chute. Fig. 6 is a detail perspective view of the vertically-movable indicator, illustrating the construction of the resilient pawl for engaging the vertical ratchet-bar.

Like numerals of reference designate corresponding parts in all the figures of the drawings.

1 designates a vertically-disposed hollow post or standard rising from a rectangular frame or casing 2, constructed of any suitable material, preferably wood, and consisting of a box having a cover 3. The hollow post or standard is open at its front, as shown, and is provided at opposite sides with vertical grooves, forming ways adapted for the reception of projections 4, extending from opposite sides of a sliding indicator 5, which is adapted to slide between the sides of the post or standard.

The sliding indicator consists of an oblong block provided with an index-finger or pointer 6, arranged adjacent to a scale 7, consisting of numbered graduations and located at one side of the post or standard at the front thereof, the sides of the post or standard being beveled at the front at opposite sides of the opening, as shown.

The apparatus is operated by striking a knob or head 8, which is located above the top of the frame or casing and which is fixed to a vertical stem 9. The vertical stem 9 passes through an opening in the top of the frame or casing and has its lower end resting upon an actuating-lever 10, and it is prevented from being withdrawn from the frame or casing by a transverse pin or other suitable stop. The actuating-lever is fulcrumed at a point intermediate of its ends between suitable supports 11 by a transverse pin 12. Its rear end extends into the opening of the hollow post or standard and is adapted to receive the sliding indicator, which is thrown violently upward by depressing the front end of the actuating-lever, and the front end of the lever 10 is held normally elevated by a spring 13, which maintains the lever 10 in proper position for receiving a blow and which returns it to that position after a blow is delivered.

The sliding indicator is maintained elevated after it has been thrown upward by the actuating-lever by a resilient pawl 14 and a vertical ratchet 15. The resilient pawl is L-shaped and secured at its upper end to the back of the indicator, the lower portion extending rearward in position to engage the teeth of the rack, and the latter consists of a vertically-disposed pivotally-mounted bar, provided at its front edge with teeth shouldered at their upper edges to be engaged by the pawl. The pivoted rack-bar is arranged parallel with the sides of the post or standard, in position for catching and holding the sliding indicator, and when it is desired to return the latter to its initial position, the rack is swung laterally out of engagement with the pawl, allowing the indicator to drop.

The actuating-lever is normally locked against operation by a horizontally-disposed spring-actuated coin-operated lever 16, fulcrumed intermediate of its ends, provided at its front end with a block 17, and having its rear end arranged at the lower end of the coin-chute 18. The block 17 is normally arranged beneath the front end of the actuating-lever and is held in position by a spring 19, engaging the outer face of the lever 16.

The coin chute or tube 18 is arranged at one side of the hollow post or standard. Its upper end forms a coin-receiving slot and its lower end is recessed to receive the rear end of the lever 16, which is provided with a recess 20, having an inclined back wall adapted to be engaged by a coin dropped into the coin-chute. The coin, as illustrated by dotted lines in Fig. 3 of the accompanying drawings, is adapted to engage the inclined wall of the recess 20 and move the lever laterally to carry its block 17 from beneath the front end of the actuating-lever 10 to release the latter and enable it to be operated when the head 8 is struck. The coin-tube may be constructed to receive any predetermined coin, preferably a nickel.

The coin is supported over an opening 21, when in engagement with the lever 16, by a cut-off lever 22, pivoted intermediate of its ends and connected by a link-bar 23 with an arm 24 of the rack 15. The arm 24 is provided with a handle, and when the rack is in position for catching and holding the vertically-movable indicator the cut-off lever covers the opening and prevents the coin from dropping into a suitable till or receptacle; but when the rack is swung to one side to allow the indicator to fall the cut-off lever uncovers the opening and permits the coin to fall into a suitable receptacle provided for the same. As soon as the lever 16 is relieved of the coin the spring throws its block 17 beneath the actuating-lever 10 and prevents the apparatus from being operated again until the proper coin is deposited in the coin-chute.

It will be seen that the coin-controlled and strength-testing apparatus is simple and inexpensive in construction, that it is positive and reliable in operation, and that it is under complete control of the operator. It will also be apparent that it cannot be operated without depositing the proper coin into it and that it cannot be reset without causing the coin-controlled lever 16 to engage the actuating-lever.

Changes in the form, proportion, and minor details of construction may be resorted to without departing from the spirit or sacrificing any of the advantages of this invention.

What I claim is—

1. In a device of the class described, the combination of a vertical post or standard, a sliding indicator mounted thereon, an actuating-lever arranged to engage the sliding indicator and adapted to receive a blow, whereby the indicator is thrown upward, and a movable rack arranged to engage the indicator when thrown upward, to maintain it in an elevated position, and adapted to be moved out of such engagement to return the indicator to its initial position, substantially as described.

2. In a device of the class described, the combination of a vertical post or standard, a vertically-movable indicator mounted therein, an actuating-lever arranged to engage the indicator and adapted to throw the same upward, a resilient pawl carried by the indicator, and a vertically-disposed pivotally-mounted rack-bar provided with teeth arranged to be engaged by the pawl to maintain the indicator in an elevated position, said rack-bar being adapted to be turned out of engagement with the pawl to permit the indicator to fall, substantially as described.

3. In a device of the class described, the combination of a frame or casing, a vertical post or standard rising therefrom, a vertically-movable indicator mounted on the post or standard, an actuating-lever fulcrumed intermediate of its ends in the frame or casing and having one end arranged to engage the indicator, a stem loosely mounted in the top of the frame or casing, resting upon the actuating-lever and provided with a head adapted to receive a blow, whereby the indicator is thrown upward, and a coin-operated lever extending beneath the actuating-lever at a point below the stem and forming a stop, substantially as described.

4. In a device of the class described, the combination of a hollow post or standard provided at opposite sides with ways and having a scale, a vertically-movable indicator mounted in said ways and provided with an index finger or pointer arranged adjacent to the scale, a lever fulcrumed intermediate of its ends in the frame or casing, and having its rear end arranged beneath the indicator, a stem mounted on the frame or casing and provided with a head and resting upon the front end of the actuating-lever, and a movable rack mounted in the post or standard and arranged to engage the indicator to maintain the latter in an elevated position, substantially as described.

5. In a device of the class described, the combination of a frame or casing, a post or standard, a vertically-movable indicator mounted thereon, an actuating-lever fulcrumed intermediate of its ends and having its rear end arranged beneath the indicator, a spring engaging the front end of the lever and adapted to hold the same normally elevated, a spring-actuated coin-operated lever having one end arranged beneath the front end of the actuating-lever, and a coin-chute terminating above the other end of the coin-operated lever and adapted to direct a coin into engagement with the same, whereby the coin-operated lever is moved from beneath the actuating-lever, substantially as described.

6. In a device of the class described, the combination of a post or standard, a vertically-movable indicator, a movable rack adapted to hold the indicator in an elevated position and provided with an arm or handle, an actuating-lever fulcrumed within the casing and having its rear end arranged to engage the indicator, a coin-operated lever, having one end arranged beneath the front end of the actuating-lever, a cut-off lever arranged beneath the rear end of the coin-operated lever and adapted to support a coin in engagement with the same and connected with the arm or handle, whereby, when the rack is moved out of engagement with the indicator, the support will be withdrawn from the coin to release the coin-operated lever, and a spring for moving the front end of the latter to a position beneath the actuating-lever, substantially as and for the purpose described.

In testimony that I claim the foregoing as my own I have hereto affixed my signature in the presence of two witnesses.

HANS K. HANSEN.

Witnesses:
W. C. GERNER,
E. B. HANSON.